E. J. P. MEYER.
CAR CONSTRUCTION.
APPLICATION FILED DEC. 24, 1914.
1,189,717.
Patented July 4, 1916.
4 SHEETS—SHEET 1.
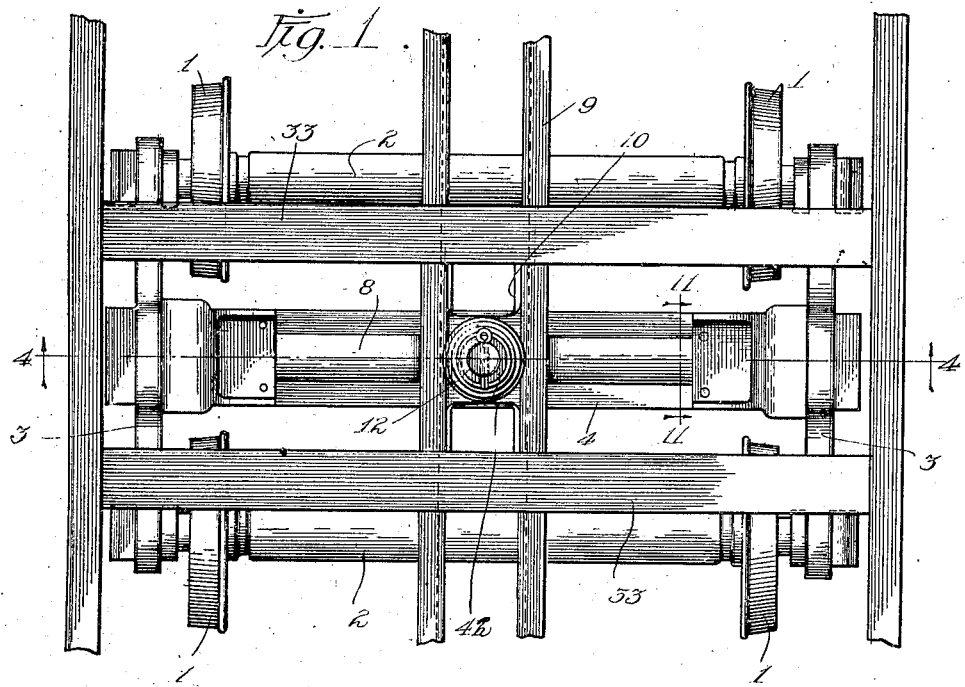
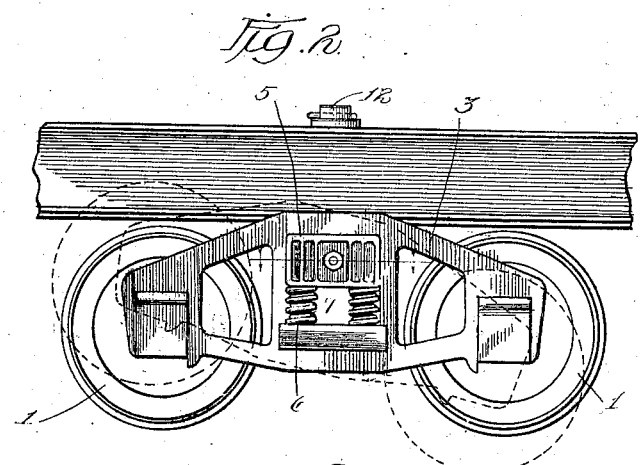
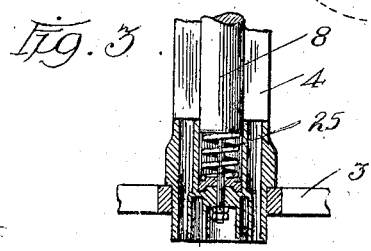
Witnesses
Inventor
Emil J. P. Meyer
By Hill & Hill Attys.

E. J. P. MEYER.
CAR CONSTRUCTION.
APPLICATION FILED DEC. 24, 1914.
1,189,717.
Patented July 4, 1916.
4 SHEETS—SHEET 2.
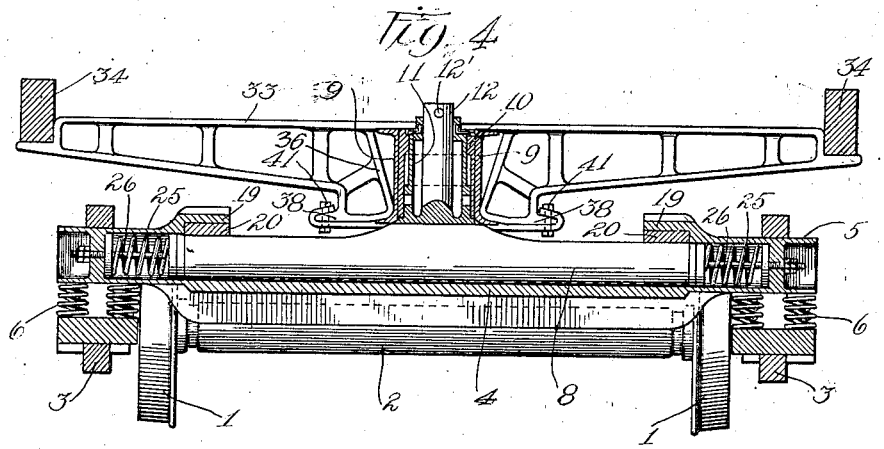
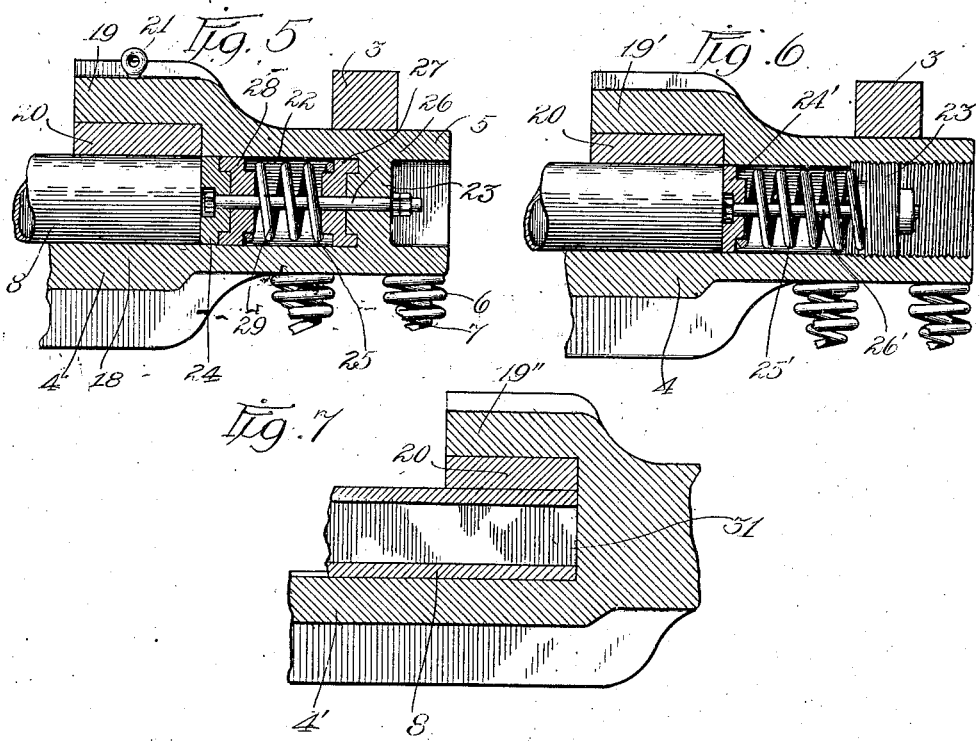
Witnesses:
Arthur H. Carlson
Robert V. Weir
Inventor:
Emil J. P. Meyer
By Hill & Hill
Attys.

E. J. P. MEYER.
CAR CONSTRUCTION.
APPLICATION FILED DEC. 24, 1914.
1,189,717.
Patented July 4, 1916.
4 SHEETS—SHEET 3.
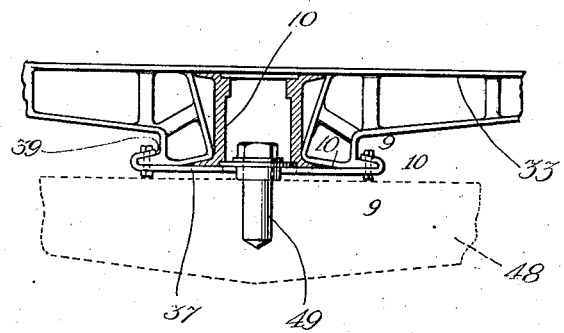
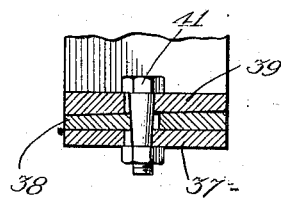
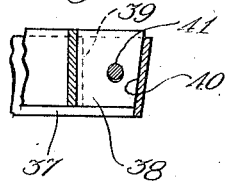
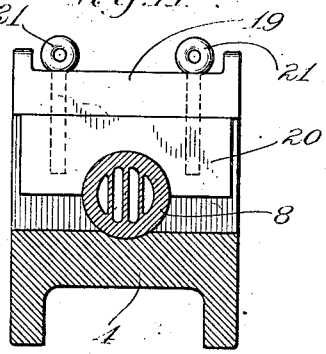
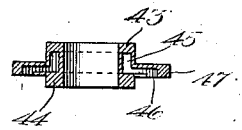
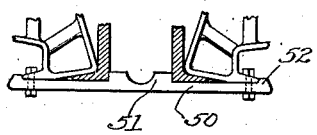
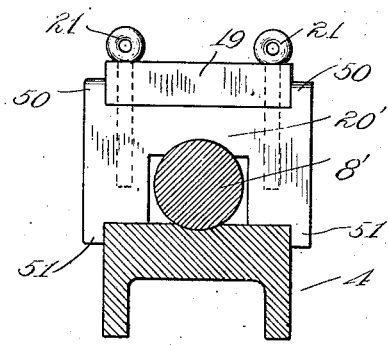
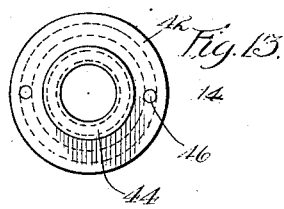
Inventor:
Emil J. P. Meyer E. J. P. MEYER.
CAR CONSTRUCTION.
APPLICATION FILED DEC. 24, 1914.
1,189,717.
Patented July 4, 1916.
4 SHEETS—SHEET 4.
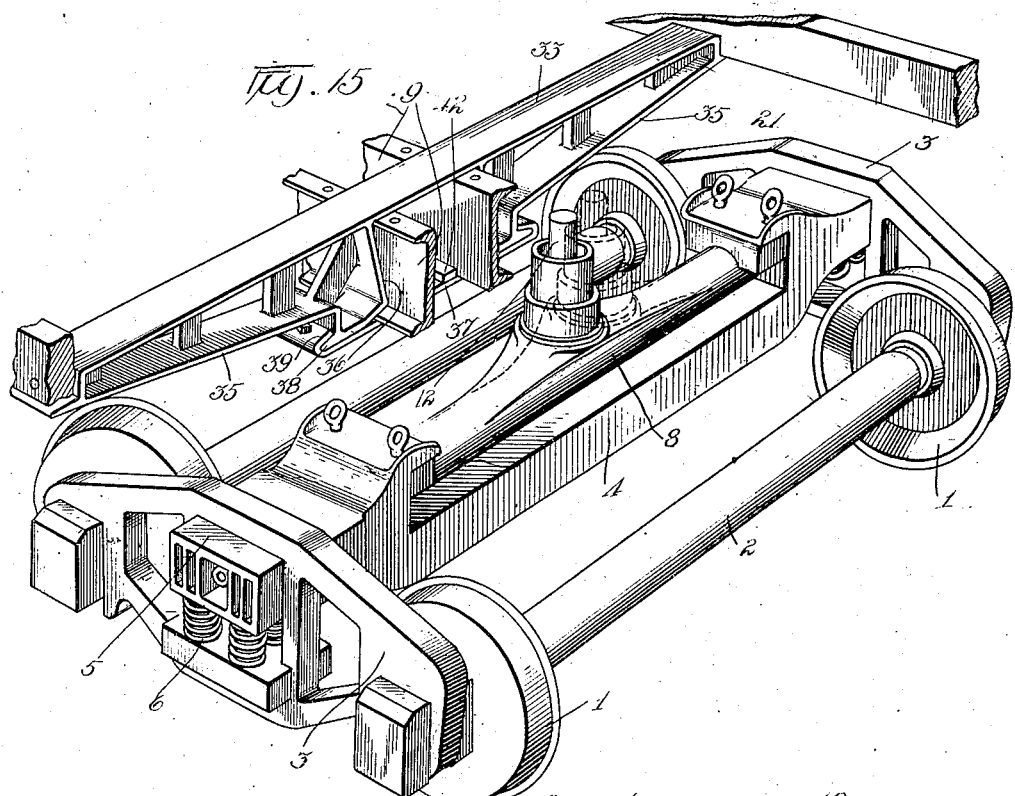
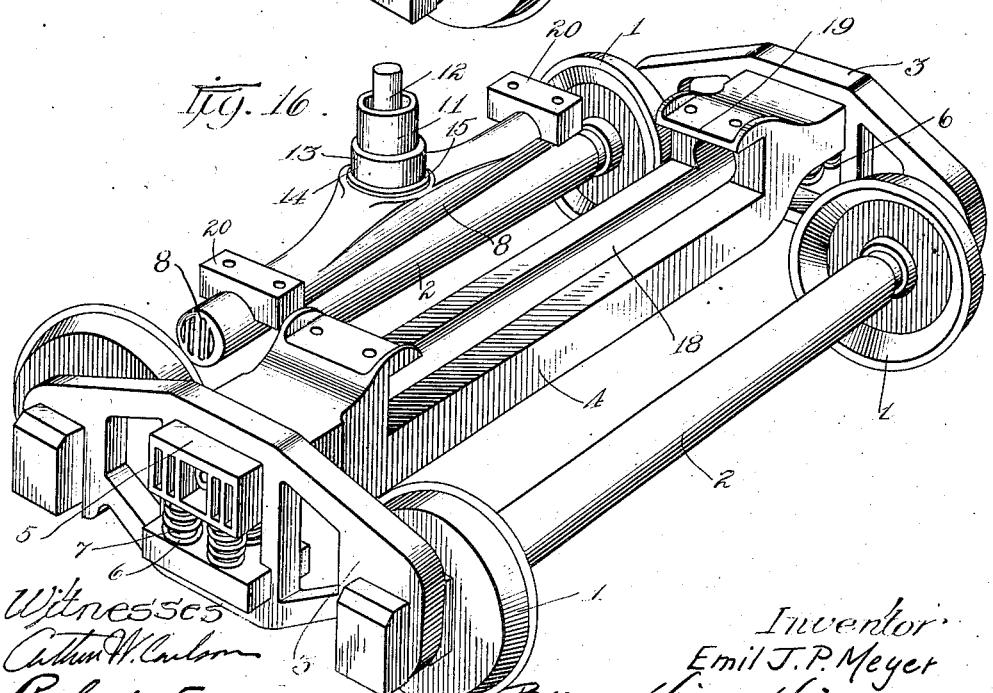

UNITED STATES PATENT OFFICE.

EMIL J. P. MEYER, OF CHICAGO, ILLINOIS.

CAR CONSTRUCTION.

1,189,717.   Specification of Letters Patent.   Patented July 4, 1916.

Application filed December 24, 1914. Serial No. 878,916.

*To all whom it may concern:*

Be it known that I, EMIL J. P. MEYER, a citizen of the United States, residing at Chicago, in the county of Cook and State of Illinois, have invented certain new and useful Improvements in Car Constructions, of which the following is a description.

My invention belongs to that general class of devices in car constructions known as car bolsters and the body frame or bolster, and more particularly relates to an improved form of truck bolster, as well as an improved structure of car body frame for use therewith.

The invention has among its objects the production of a construction of the kind described that is simple, convenient, efficient, durable, compact and satisfactory.

It has among its further objects the production of a car construction in which the trucks may be detached from the body or attached thereto with a minimum of time and labor, and without requiring the jacking-up of the car body to an extent where the same may be warped, twisted or strained.

It has among its further objects the production of an easier riding truck, which in use will have a longer life or service, as well as lengthening the serviceable life of the car body and frame. It also tends to reduce the repairs of the body or truck, owing to the easy manner in which the body is carried by the truck, without any undue stress or strains.

Other objects and advantages of the construction will appear to those skilled in the art from the disclosures herein made.

To this end my invention consists in the novel construction, arrangement and combination of parts herein shown and described, and more particularly pointed out in the claims.

In the drawings, wherein like reference characters indicate like or corresponding parts, Figure 1 is a top plan view of the truck and portion of the frame of the car body; Fig. 2 is a side elevation of the same; Fig. 3 is a sectional view taken substantially on line 3, 3 of Fig. 2; Fig. 4 is a sectional view taken substantially on line 4, 4 of Fig. 1; Fig. 5 is an enlarged sectional view taken substantially on line 5, 5 of Fig. 1, the same being substantially an enlargement of a portion of Fig. 4; Fig. 6 is a similar view of a slightly different construction; Fig. 7 is a similar view of a simplified construction; Fig. 8 is a view similar to a portion of Fig. 4, with the truck removed and a substitute truck indicated in dotted lines; Fig. 9 is a sectional view taken substantially on line 9, 9 of Fig. 8; Fig. 10 is a sectional view taken substantially on line 10, 10 of Fig. 8; Fig. 11 is a sectional view taken substantially on line 11, 11 of Fig. 1; Fig. 12 is a similar view, illustrating a slightly different rocking member; Fig. 13 is a plan view of the under side of the cap 43; Fig. 14 is a sectional view of the same, taken substantially on line 14, 14 of Fig. 13; Fig. 15 is a perspective view of a truck, a portion of the body frame, or part of the frame view cut away, so as to more clearly show the truck construction; Fig. 16 is a similar view of the truck with a portion of the same detached to illustrate the removal of the truck from the car body, and Fig. 17 is a view in elevation of a substitute for the retainer 37.

It may be mentioned that I have not considered it necessary to illustrate a car with all the details thereof, but only such parts as form a part of the present invention. Neither have I considered it necessary to show with great detail and exactness parts of the structures illustrated, which in themselves form no part of the present invention, and which may be modified as found desirable to correspond with any particular manufacture. It may be further mentioned that the present invention is in the nature of an improvement over the car construction shown in my U. S. Letters Patent No. 1,098,820, dated June 2, 1914.

In the present device, 1 represents the wheels of one of the trucks, connected by the usual axles 2, arranged to seat in any suitable bearings and carry the truck frame 3. The frame parts 3 are connected by a bolster 4, having the ends 5 arranged to be suitably carried by the end frames 3 of the truck. I have shown the bolster 4 carried by springs 6, the springs being secured in place in any of the well known manners. In addition to the springs 6, I have employed the desired number of additional springs 7, upon which the cross bolster 4 of the truck will be additionally supported in case of excessive loads or jars and bouncing of the parts. The springs 7 may be termed shock absorbers, as they substantially perform this function, and are auxiliary to the main supporting springs 6. Arranged to be carried by the bolster part 4 is a detachable bolster part 8, the same forming or constituting in reality a part of the truck bolster when it is seated and secured in place. This bolster part 8 is provided with an extending post or bearing member 11, which forms a center bearing or support for the car body and secures the body on the truck. The post shown is substantially similar to the post shown in my prior patent mentioned. It is provided with a centrally-extending post 12, which is enlarged at 13 and formed with a bearing 15 at the base, 14 being holes or the like, through which a suitable lubricant may be discharged.

The car body construction in the device shown consists of a pair of parallel extending channels or beams arranged centrally the car body, and provided with a bearing member 10 at each end, which is suitably flanged and secured to the beams in any suitable manner. Where the car body is constructed differently than I have shown, the part 10, or its equivalent, may, of course, be secured to any suitable part of the car or body, the arrangement illustrated being merely the preferred construction, and which I consider very desirable.

It may be noted that the part 8 with its upwardly extending post may be termed a T-shaped bolster part, with the leg of the T extending upwardly, that is the T is upside down or reversed. The underside and ends of the part 8 are preferably made cylindrical or semi-cylindrical in shape, as shown, and the truck or bolster part 4 provided with a substantially semi-cylindrical or curved groove or recess 18 therein, in which the part 8 may rest. When positioned in the groove 18 the part 8 is secured in position and prevented from transverse movement or separation from part 4 by the locking blocks or keys 20, which are positioned under the extensions 19 formed at each end of the bolster part 4. The key 20 may be secured in position by pins 21, or equivalent means for the purpose. In the claims where I refer to one part being capable of rocking relative to the other part, I wish to be understood that either part may be considered as doing the actual rocking, the results being the same. In the construction shown in Figs. 1, 2, 4, 5 and 15, 16, the part 8 may not only be rocked on the bolster part 4, for example as indicated in Fig. 2, but it may also have a longitudinal movement or movement transversely the car, as is indicated in the dotted lines in Fig. 15. The construction permitting this is illustrated in detail in Fig. 5, in which figure it will be noted that each end 5 of the part 4 is formed with a chamber 22 of a size to receive the end of the part 8. The chamber is closed, however, by a closure or partition 23, and the part 8 normally maintained in a central position by an adjustable part 24, and a spring 25 arranged at each end of the part 8. The movement of the part 24 is limited, however, by a bolt 26, or equivalent means, so that the same will not project from or move out of the chamber 22. The tension or strength of the spring may be as desired. An adjustment may be had by placing filling members 27 or 28 at either or both ends of the chamber 22, which increases the effect of the spring by putting it under a pressure, that is, compressing it. An additional spring may be arranged within the chamber, to act as a shock absorber in case of an unusual movement of the part 8, the same serving to reinforce the spring 25 in emergency.

In Fig. 6 I show a slightly modified construction, in which part 23' may be adjusted, thereby varying the effect of spring 25'. a bolt or rod 26' similar to 26 being provided. This construction merely illustrates another form of adjustment.

In Fig. 7 a simplified construction is shown, in which the end of part 8 butts against the end of wall 31 of the bolster part, the key 20 being secured in place by pins extending through the extension 19''. With this construction, of course, part 8 has no endwise movement, but may be rocked on part 4' similar to the other constructions.

As before mentioned, in the construction shown the car is provided with centrally extending beams 9, forming a part of the body frame. Arranged to be carried thereby are cross or body bolsters 33, which carry the side sills 34. There may be any desired number of cross bolsters 33, and the proportion and design of the same may vary as found desirable. In the construction shown the bolsters 33 are formed with an under part 35, which is connected by the parts 36 to the top 33 in proximity to the beams, the arrangement being such that the parts substantially closely fit the beams as shown in Figs. 4, 8 and 15. The bolsters 33 may be bolted to the beams, if desired. In addition to the bolts, however, I use locking members or binders 37. These are formed with hooked ends adapted to engage the extensions 38 on the bolsters. In Figs. 9 and 10 I show the preferred construction in more detail, in which as the members 37 are placed and drawn into position, they substantially engage with the parts 38, giving an exceedingly tight fit, as well as drawing the parts 36 against the lower flange of the beams 9. Fig. 9 shows the end 38 shown with a slight taper from one side to the other, that is, it is wedge-shaped, so that the end 30 and lower side 38 tightly fit together. As shown in Fig. 10, the ends of 38 are formed with a bend or cut at an angle, as shown, at 40. When a tapering bolt 41 is employed, and the same drawn down, the same tends to draw the part 37 into position, as shown in Figs. 9 and 15. The tighter the bolt is drawn down the more tightly the part 37 engages with the ends 38. Either or both constructions may be omitted, but I prefer in most cases to embody the construction shown in Fig. 10, to which may be added the arrangement shown in Fig. 9, if desired. As shown in Fig. 15, lugs 42 may be provided on binders 37 to prevent the beams being drawn together. A binder or retainer 50 of slightly different construction is shown in Fig. 17, which is provided with lugs 51 and 52, arranged to space the beams, the part being bolted to the cross bolster.

In Fig. 14 I have illustrated a form of cap suitable to be mounted upon the post 12, and bear against the part 10, to lock the car body on the truck. While it is not absolutely necessary, I usually prefer to employ it. Referring to Figs. 13 and 14, the part 43 is formed with a flange 47, and projected downward as at 44. The same may be chambered as at 45, if desired, and provided with openings 46. The purpose of the chamber is to provide the cap with a suitable lubricant, which may work out through the openings 46 and thoroughly lubricate the parts. The cap may be maintained in position by a pin, or equivalent means, extended through the hole 12, or in the post 12. The cap 43 has an additional function. In case the truck of the car should be entirely disabled, any of the trucks commonly in use at the present time may be substituted by placing the cap 43 at the bottom of the bearing 10, so that the same will serve as a bearing for the usual center part of the type illustrated in dotted lines on the truck bolster 48. The part 43 may, of course, be bolted to part 10 when seated, as shown in Fig. 8, similar to the construction shown in my prior patent mentioned. If desired, king bolt 49 may also be employed.

A slightly modified locking member or key 20' is shown in Fig. 12. In this case the truck bolster 4 may be similar to any of those described, as may be the T-shaped part 8'. The key 20' is shown, however, formed with flanges 50 and 51, arranged to engage with the sides of the extension 19 and the bolster 4 respectively.

In case it is desired to remove the truck from the car body, the body of the car is jacked up only sufficiently to take all weight or pressure off of the truck, but need not be sufficient to lift the body off of the part. In other words, it is only necessary to jack the same up sufficiently to relieve the weight on the springs of the truck. The pins 21, or their equivalents, may then be removed and the keys 20 moved toward the center post, so that the part 8 may be raised out of the groove 18, after which the truck may be drawn or pushed, out from under the end of the car. The pin 12' may then be removed, whereupon the part 8 may be dropped or removed. If it is desired to place a new truck under the car to replace the truck renewed, the operations are merely reversed. If a special truck similar to that shown is not at hand, any type of truck may be used by reversing the plate 43, as described.

When the car is in use the truck and body not only have the usual pivotal action relative one another, but one or the other may be rocked as indicated in Fig. 2, it being immaterial as to which rocks, and in fact both may rock at the same time. With the constructions illustrated in Figs. 15 and 16, the body and truck are also relatively adjustable transversely the car. The result is that on an extremely rough roadbed, or a roadbed with many curves, or where a load of freight is carried, which is not evenly distributed throughout the car, or may shift and rock, the car body at all times rides easily and with a minimum of vibration and shocks. It will be noted that with the construction the usual side bearings on the trucks are unnecessary and may be done away with, although they may be used if preferred.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a device of the kind described and in combination, a truck bolster comprising two parts, one part provided with a post projecting from one side and arranged to be seated on the other part, and means for detachably securing said parts together.

2. In a device of the kind described and in combination, a truck bolster comprising two parts, one part provided with a post projecting from one side and arranged to be seated on the other part, said post part partially rotatable about its longitudinal axis, and means for securing said parts together.

3. In a device of the kind described and in combination, a truck bolster comprising two parts, one part provided with a post projecting from one side and arranged to be seated on the other part, said post part longitudinally slidable on its center axis, and means for securing said parts together.

4. In a device of the kind described and in combination, a truck bolster comprising two parts, one part provided with a post projecting from one side and arranged to be seated on the other part, said post part slidable lengthwise and partially rotatable about its center axis, and means for securing said parts together.

5. In a device of the kind described and in combination, a truck bolster comprising a plurality of parts, one part extending across the truck and suitably supported thereby, said part having a groove extending lengthwise across the top side of the same, the other part arranged to seat in said groove, and provided with a suitably formed post arranged intermediate the ends thereof, and projecting therefrom, and means for securing said parts together.

6. In a device of the kind described and in combination, a truck bolster comprising a plurality of parts, one part extending across the truck and suitably yieldingly supported thereby, said part having a groove extending lengthwise across the top side of the same, the other part arranged to seat in said groove, and partially rotatable therein, and provided with a suitably formed post arranged intermediate the ends thereof, and projecting therefrom, and means for detachably securing said parts together.

7. In a device of the kind described and in combination, a truck bolster comprising a plurality of parts, one part extending across the truck and suitably supported thereby, said part having a groove extending lengthwise across the top side of the same, the other part arranged to seat in said groove, and partially rotatable and endwise slidable therein, and provided with a suitably formed post arranged intermediate the ends thereof, and projecting therefrom, and means for securing said parts together.

8. In a device of the kind described and in combination, a bolster and post projecting from the upper side thereof, means for operatively securing said post in place on the bolster, said post arranged to be movable relative to the said bolster in a direction transversely to the longitudinal axis of the bolster.

9. In a device of the kind described and in combination, a bolster and post projecting from the upper side thereof, means for detachably securing said post in place, means for normally yieldingly maintaining the post at the center of the bolster, said post arranged to be movable relative the said bolster part in a direction transversely to the longitudinal axis of the bolster.

10. In a device of the kind described and in combination, a bolster comprising two parts, one partially rotatable relative the other, one part provided with a post projecting transversely therefrom, and means for securing said bolster parts together.

11. In a device of the kind described and in combination, a bolster and a post part projecting from the upper side thereof, means for securing said post in place, one of said parts arranged to be rocked on the other part in a direction transversely to the longitudinal axis of the bolster, and movable relative the part in a direction lengthwise the bolster part.

12. In a device of the kind described and in combination, a bolster and a post projecting from the upper side thereof, means for removably securing said post in place, said post arranged to be rocked on the said bolster part in a direction transversely to the longitudinal axis of the bolster, and movable lengthwise the bolster part, and means for normally preventing the movement of said post lengthwise the bolster.

13. In a device of the kind described and in combination, a suitable car truck including a yieldingly supported bolster part provided with a post extending from the upper side thereof, said post laterally movable lengthwise the bolster part, and means for securing said post to the bolster part.

14. In a device of the kind described and in combination, a suitable car truck including a yieldingly supported bolster part provided with a post extending from the upper side thereof, said post laterally movable lengthwise the bolster part in either direction, and means for securing said post to the bolster part, and means for yieldingly opposing the movement of said post lengthwise the bolster.

15. The combination in a car truck of a bolster provided with a substantially semi-cylindrical groove in the top face thereof, a coöperating bolster part arranged to be seated on the first mentioned part in said groove and partially rotatable therein, means for detachably locking said coöperating part on the bolster, said coöperating part provided with a post projecting therefrom intermediate the ends thereof.

16. In a car truck and in combination, a truck frame and bolster, yieldable means carried in said truck frame for supporting said bolster, said bolster provided with a groove extending on the top face thereof lengthwise the same proximate the ends, said bolster chambered at said ends, a coöperating bolster part positioned in said groove and arranged to rock therein, said coöperating part longitudinally movable in the groove, means maintained within said bolster chambers for normally resiliently opposing the lengthwise movement of said coöperating part, said last mentioned part provided with a post projecting therefrom on one side, and means for maintaining said coöperating part in position against lateral movement and preventing its separation from the bolster.

17. In a device of the kind described and in combination, a car truck comprising a two-part bolster, one part provided with a post projecting therefrom having a bearing at the base thereof, said part arranged to be rocked on the first bolster part or moved lengthwise thereof, resilient means for normally preventing the movement of said part lengthwise the bolster and retrieving the same to an operative central position, a car body frame including beams extending lengthwise the car with a space therebetween, a bearing member secured to said beams and arranged to coöperate with said bolster post, a plurality of car body bolsters carried by said beams, and means for securing said body bolsters thereto.

In testimony whereof, I have hereunto signed my name in the presence of two subscribing witnesses.

EMIL J. P. MEYER.

Witnesses:
  ROY W. HILL,
  CHARLES I. COBB.

Copies of this patent may be obtained for five cents each, by addressing the "Commissioner of Patents, Washington, D. C."